(12) United States Patent
Xie et al.

(10) Patent No.: US 11,338,640 B2
(45) Date of Patent: May 24, 2022

(54) FRONT-MOUNTED EXTERNAL COLD AIR INTAKE SYSTEM FOR LARGE REFRIGERATED TRUCK

(71) Applicant: Shanghai Ocean University, Shanghai (CN)

(72) Inventors: Jing Xie, Shanghai (CN); Yuyao Sun, Shanghai (CN); Jinfeng Wang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 246 days.

(21) Appl. No.: 16/826,768

(22) Filed: Mar. 23, 2020

(65) Prior Publication Data

US 2021/0146746 A1   May 20, 2021

(30) Foreign Application Priority Data

Nov. 15, 2019   (CN) .......................... 201911115263.6

(51) Int. Cl.
*B60H 1/00* (2006.01)
*B60P 3/20* (2006.01)

(52) U.S. Cl.
CPC ..... *B60H 1/00028* (2013.01); *B60H 1/00664* (2013.01); *B60P 3/20* (2013.01); *B60H 2001/00085* (2013.01)

(58) Field of Classification Search
CPC ............ B60H 1/00028; B60H 1/00014; B60H 1/00664; B60H 2001/00085; F25D 11/003; B06P 3/20; B60P 3/20
See application file for complete search history.

(56) References Cited

U.S. PATENT DOCUMENTS 5,531,641 A * 7/1996 Aldrich .............. B60H 1/00364
454/100
2015/0144296 A1   5/2015 Macron et al.
2020/0041193 A1* 2/2020 Sigety ................... F25D 23/021

FOREIGN PATENT DOCUMENTS

CN      106696810 A      5/2017
CN      207670278 U      7/2018

* cited by examiner

*Primary Examiner* — Marc E Norman

(57) ABSTRACT

The present invention relates to refrigerated trucks, more particularly to a front-mounted external cold air intake system for a large refrigerated truck, including a refrigerated compartment, an indoor chiller unit, an outdoor chiller unit, a front-mounted air duct, air outlets, horizontal louvers, folding elbows, windshields, blade control knobs, filters, covers, wind deflectors and blades. In the front-mounted cold air intake system, the front-mounted air duct introduces outdoor cold air into the refrigerated compartment, and transmits and distributes the cold air through the air outlets. Moreover, the air window structures formed by the horizontal shutters, the folding elbows and the windshields are used for discharging air, so as to stabilize the pressure in the refrigerated compartment. The system of the present invention uses outdoor cold air to effectively cool the compartment allowing for energy saving of the refrigerated truck.

10 Claims, 4 Drawing Sheets

FRONT-MOUNTED EXTERNAL COLD AIR INTAKE SYSTEM FOR LARGE REFRIGERATED TRUCK

CROSS-REFERENCE TO RELATED APPLICATIONS

This application claims the benefit of priority from Chinese Patent Application No. 201911115263.6, filed on Nov. 15, 2019. The content of the aforementioned application, including any intervening amendments thereto, is incorporated herein by reference in its entirety.

TECHNICAL FIELD

The present application relates to refrigerated trucks, more particularly to a front-mounted external cold air intake system for a large refrigerated truck.

BACKGROUND OF THE INVENTION

At present, refrigerated trucks which mainly use chillers for refrigeration are widely used for transporting frozen food, thereby ensuring convenient transportation and quality of the frozen food. However, in colder regions or in winter, the outdoor temperature is often much lower than the indoor temperature. Cold air from the outside may be introduced into the refrigerated compartment of the refrigerated truck to cool the food in the refrigerated compartment, thereby saving the energy consumption of the chillers.

SUMMARY OF THE INVENTION

A purpose of the present invention is to provide a front-mounted external cold air intake system for a large refrigerated truck, in which a device is mounted in the front side of a refrigerated compartment to absorb an airflow generated by the refrigerated truck during driving. At the same time, it is combined with other related equipment to introduce external cold air into the refrigerated compartment of the refrigerated truck and use the introduced cold air to cool the refrigerated compartment, thereby reducing energy consumption of the chillers.

To achieve the purpose above, the present invention provides a front-mounted external cold air intake system for a large refrigerated truck, comprising: a refrigerated compartment, an indoor chiller unit, an outdoor chiller unit, a front-mounted air duct, a plurality of air outlets, a plurality of horizontal louvers, a plurality of folding elbows, a plurality of windshields, a plurality of blade control knobs, a plurality of filters, a plurality of covers, a plurality of wind deflectors and a plurality of blades;

wherein, the air outlets comprise a first air outlet, a second air outlet, a third air outlet, a fourth air outlet, a fifth air outlet, a sixth air outlet, a seventh air outlet, an eighth air outlet, a ninth air outlet, a tenth outlet and an eleventh air outlet; the horizontal louvers comprise a first horizontal louver and a second horizontal louver; the folding elbows comprise a first folding elbow and a second folding elbow; the windshields comprise a first windshield and a second windshield; the blade control knobs comprise a first blade control knob and a second blade control knob; the filters comprise a first filter and a second filter; the covers comprise a first cover and a second cover; the wind deflectors comprise a first wind deflector, a second wind deflector, a third wind deflector, and a fourth wind deflector; a fifth wind deflector, a sixth wind deflector, a seventh wind deflector, an eighth wind deflector, a ninth wind deflector, and a tenth wind deflector; the blades comprise a first blade, a second blade, a third blade, a fourth blade, a fifth blade, a sixth blade, a seventh blade, an eighth blade, a ninth blade, a tenth blade, an eleventh blade, a twelfth blade, a thirteenth blade, a fourteenth blade, a fifteenth blade, a sixteenth blade, a seventeenth blade, an eighteenth blade, a nineteenth blade and a twentieth blade;

the first air outlet, the second air outlet, the third air outlet, the fourth air outlet, and the fifth air outlet form a first air outlet group; the sixth air outlet, the seventh air outlet, the eighth air outlet, the ninth air outlet and the tenth air outlet form a second air outlet group; the first horizontal louver, the first folding elbow and the first windshield form a first air window structure; the second horizontal louver, the second folding elbow and the second windshield form a second air window structure; the first blade, the second blade, the third blade, the fourth blade, the fifth blade, the sixth blade, the seventh blade, and the eighth blade, the ninth blade and the tenth blade form a first blade group; the eleventh blade, the twelfth blade, the thirteenth blade, the fifteenth blade, the sixteenth blade, the seventeenth blade, the eighteenth blade, the nineteenth blade and the twentieth blade form a second blade group;

the indoor chiller unit is mounted on a middle at a top of a front inner side of the refrigerated compartment; the outdoor chiller unit is mounted on a middle at a top of a front outer side of the refrigerated compartment; an installation position of the indoor chiller unit corresponds to that of the outdoor chiller unit; the front-mounted air duct is U-shaped and has a rectangular cross section, and is mounted in the refrigerated compartment; two air inlets are mounted at two sides of the outdoor chiller unit; the air outlets are mounted on the front-mounted air duct and comprise non-return three-way air outlets and a reversing three-way air outlet, wherein the non-return three-way air outlets spaced apart are arranged on a straight section of the front-mounted air duct that is parallel to an axis of the refrigerated compartment, and the reversing three-way air outlet is mounted on an arc section of the front-mounted air duct at a junction of the front-mounted air duct and the axis of the refrigerated compartment; the horizontal louvers are mounted on a lower part of both sides of the refrigerated compartment; each of the horizontal louvers consists of 10 blades, and directions in which the blades rotate are controlled by the blade control knobs, wherein a safety angle of rotation of each of the blades is 15° with a buffer margin of 3-5°; the windshields are mounted outside the horizontal louvers and are connected with the refrigerated compartment via the folding elbows; an opening angle of windshields is controlled by the folding elbows; wherein a safety opening angle of each of the windshields is 0-15° with a buffer margin of 3-5°; the horizontal louvers, the folding elbows and the windshields form the first and second air window structures; the filters are mounted at the air inlets of the front-mounted air duct, and cover the air inlets; and the covers are mounted in a front outer side of the refrigerated compartment for closing the front-mounted air duct when the front-mounted external cold air intake system is not in use.

Preferably, the front-mounted air duct and the air outlets are made of aluminum alloy.

Preferably, the air inlets of the front-mounted air duct are covered with the filters.

Preferably, the air outlets incline to a direction in which external cold air enters the front-mounted air duct.

Preferably, a distance between two adjacent air outlets is 800-1200 mm.

Optionally, when mounting the filters, an elastic margin of 0.5-2 cm is remained for each of the filters to withstand an impact of an air flow.

Optionally, a maximum opening angles of each of the windshields is 18°~20°.

Preferably, the folding elbows are made of soft plastics.

Optionally, the blades of the horizontal louvers are made of resin or lightweight materials.

Preferably, the horizontal louvers are used to discharge air for air circulation, and mounted on lower parts of two sides close to a rear side of the refrigerated compartment.

Optionally, a vertical height of each of the wind deflectors is 30% to 40% of a height of the front-mounted air duct.

The invention provides the front-mounted external cold air intake system which introduces outdoor cold air into the refrigerated compartment to cool the frozen food during driving. Meanwhile, the filters are provided to isolate small particles from the front-mounted air duct, ensuring cleanness of the cold air introduced into the refrigerated compartment; the horizontal louvers mounted at the two sides close to the rear side of the refrigerated compartment combine with the windshields for exhausting, thereby forming good air circulation. The present invention makes a contribution to energy saving and novel structures of the refrigerated truck.

DETAILED DESCRIPTION OF EMBODIMENTS

The embodiments of the present invention will be described below in detail with reference to the accompanying drawings.

A large-sized refrigerated truck with a front-mounted external cold air intake system of the present invention is designed based on a Dongfeng Tianjin large-sized refrigerated truck. The overall size of the refrigerated truck is 9995×2530×3900 mm. The size of the compartment is 7400×2300×2400 mm, with a wall thickness of 80 mm.

Figure 1A:
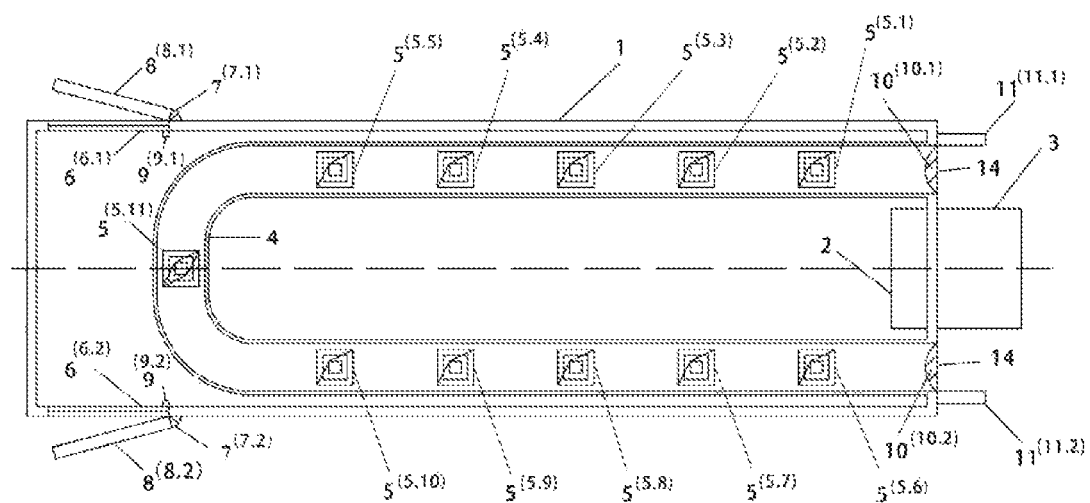
FIG. 1A is a top view of a front-mounted external cold air intake system for a large refrigerated truck.
Figure 1B:
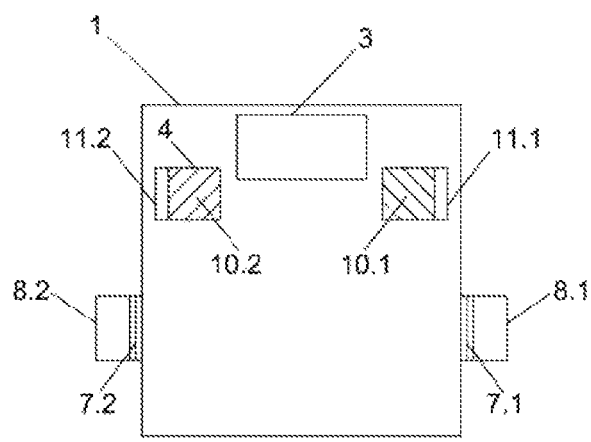
FIG. 1B is a right view of the front-mounted external cold air intake system for the large refrigerated truck.

This embodiment illustrates the front-mounted external cold air intake system for the large refrigerated truck. FIG. 1A is a top view of the front-mounted external cold air intake system for the large refrigerated truck of the present invention; and FIG. 1-B is a right view of the front-mounted external cold air intake system for the large refrigerated truck of the present invention. The front-mounted external cold air intake system for the large refrigerated truck includes a refrigerated compartment 1; an indoor chiller unit 2, an outdoor chiller unit 3, a front-mounted air duct 4, a plurality of air outlets 5, a plurality of horizontal louvers 6, a plurality of folding elbows 7, a plurality of windshields 8, a plurality of blade control knobs 9, a plurality of filters 10, a plurality of covers 11. The air outlets 5 include a first air outlet 5.1, a second air outlet 5.2, a third air outlet 5.3, a fourth air outlet 5.4, a fifth air outlet 5.5, a sixth air outlet 5.6, a seventh air outlet 5.7, an eighth air outlet 5.8, a ninth air outlet 5.9, a tenth air outlet 5.10 and an eleventh air outlet 5.11. The horizontal louvers 6 include a first horizontal louver 6.1 and a second horizontal louver 6.2. The folding elbows 7 include a first folding elbow 7.1 and a second folding elbow 7.2. The windshields 8 include a first windshield 8.1 and a second windshield 8.2. The blade control knobs 9 include a first blade control knob 9.1 and a second blade control knob 9.2. The filters 10 include a first filter 10.1 and a second filter 10.2; the covers 11 include a first cover 11.1 and a second cover 11.2.

The first air outlet 5.1, the second air outlet 5.2, the third air outlet 5.3, the fourth air outlet 5.4, and the fifth air outlet 5.5 form a first air outlet group; the sixth air outlet 5.6, the seventh air outlet 5.7, the eighth air outlet 5.8, the ninth air outlet 5.9, and the tenth outlet 5.10 form a second air outlet group.

The first horizontal louver 6.1, the first folding elbow 7.1, the first windshield 8.1 and the first blade control knob 9.1 form a first air window structure; the second horizontal louver, the second folding elbow, the second windshield and the second blade control knob 9.2 form a second air window structure.

The indoor chiller unit 2 with a width of 1000 mm is mounted on a middle at a top of a front inner side of the refrigerated compartment 1; the outdoor chiller unit 3 with a width of 1000 mm is mounted on a middle at a top of a front outer side of the refrigerated compartment 1; the front-mounted air duct 4 is mounted on the upper part of the refrigerated compartment 1; two air inlets 14 are mounted at the upper part of the interior of the refrigerated compartment 1, and each of the air inlets has a distance of 205 mm from a closer side of the refrigerated compartment 1; the front-mounted air duct 4 is a U-shaped rectangular pipe, which is composed of 3 straight sections and 2 arc sections, where all sections are rectangles of 400×400 mm; there are 2 long straight sections with a length of 5680 mm parallel to a length of the refrigerated compartment, and there is a short straight section with a length of 450 mm parallel to a width direction of the refrigerated compartment; each of the 2 arc sections is a quadrant arc with an outer radius of 820 mm and an inner radius of 370 mm; the first air outlet 5.1, the second air outlet 5.2, the third air outlet 5.3, the fourth air outlet 5.4, the fifth air outlet 5.5, the sixth air outlet 5.6, the seventh air outlet 5.7, the eighth air outlet 5.8, the ninth air outlet 5.9, the tenth air outlet 5.10, and the eleventh air outlet 5.11 are all centrally mounted on a lower part of the front-mounted air duct 4, and are rectangles of 300×300 mm; the first air outlet group and the second outlet group are respectively mounted on the long straight sections of the front-mounted air duct 4, where a distance between two adjacent air outlets is 700 mm; the first air outlet 5.1 and the sixth air outlet 5.6 both have a distance of 850 mm from the front side of the refrigerated compartment 1, and the eleventh air outlet 5.11 is mounted on a center of the short straight section of the front-mounted air duct 4; the first filter 10.1 and the second filter 10.2 are respectively mounted at the two air outlets 14 of the front-mounted air duct 4, to cover the two air outlets to prevent small particles from entering the refrigerated compartment 1; the first cover 11.1 and the second cover 11.2 with a size of 400×400 mm are respectively mounted beside the two air inlets 14 of the front-mounted air duct 4; when it is not necessary to introduce outdoor air into the refrigerated truck, the first cover 11.1 and the second cover 11.2 are turned to close the two air inlets 14 of the front-mounted air duct 4; the first air window structure and the second air window structure are respectively mounted at the rear of both sides of the refrigerated compartment 1, and are 180 mm away from the rear of the refrigerated compartment; the first blade control knob 9.1 and the second blade control knob 9.2 are respectively mounted on both inner sides of the refrigerated compartment 1, and respectively next to the first horizontal shutter 6.1 and the second horizontal shutter 6.2 to control the opening and closing of the first horizontal louver 6.1 and second horizontal louver 6.2.

The front-mounted air duct 4, the first air outlet 5.1, the second air outlet 5.2, the third air outlet 5.3, the fourth air outlet 5.4, the fifth air outlet 5.5, the sixth air outlet 5.6, the seventh air outlet 5.7, the eighth air outlet 5.8, the ninth air outlet 5.9, the tenth air outlet 5.10, the eleventh air outlet 5.11, the first windshield 8.1, the second windshield 8.2, the first cover 11.1 and the second cover 11.2 are all made of aluminum alloy to ensure a higher strength and waterproof performance of the refrigerated truck.

There is an elastic margin of 1 cm left to withstand an impact of airflow when the first filter 10.1 and the second filter 10.2 are mounted.

The opening and closing of the first cover 11.1 and the second cover 11.2 are manually controlled.

The first folding elbow 7.1 and the second folding elbow 7.2 are made of soft plastics, so that they are capable of freely expanding and contracting when the first windshield 8.1 and the second windshield 8.2 are rotated.

Maximum opening angles of the first windshield 8.1 and the second windshield 8.2 are set to 20°, but they can only be opened to 15° at most when in use; the scales of the opening degree are respectively marked on the first folding elbow 7.1 and the second folding elbow 7.2, where the remaining 5° is used as a buffer margin to prevent the damage caused by excessive force.

Figure 2A:
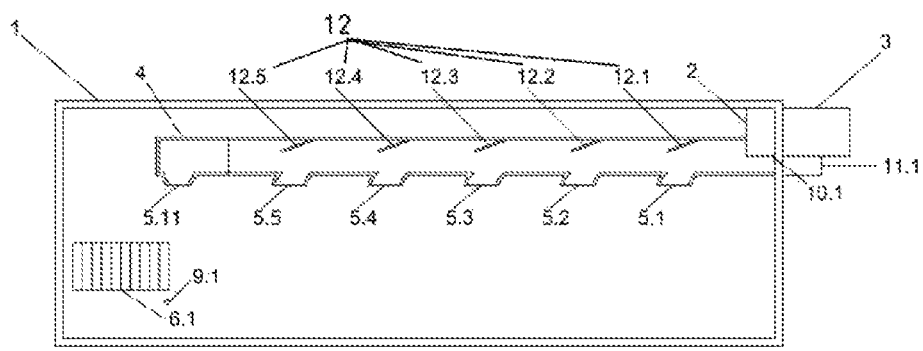
FIG. 2A is a sectional view of a first side of the front-mounted external cold air intake system for the large refrigerated truck.
Figure 2B:
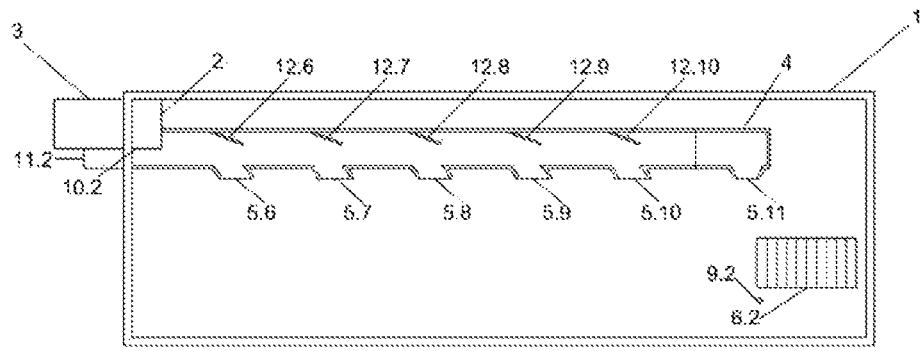
FIG. 2B is a sectional view of a second side of the front-mounted external cold air intake system for the large refrigerated truck.

FIG. 2A is a sectional view of a first side of the front-mounted external cold air intake system for the large refrigerated truck; and FIG. 2B is a sectional view of a second side of the front-mounted external cold air intake system for the large refrigerated truck. The front-mounted external cold air intake system for the large refrigerated truck includes the refrigerated compartment 1, the indoor chiller unit 2, the outdoor chiller unit 3, the front-mounted air duct 4, the first air outlet 5.1, the second air outlet 5.2, the third air outlet 5.3, the fourth air outlet 5.4, the fifth air outlet 5.5, the sixth air outlet 5.6, the seventh air outlet 5.7, the eighth air outlet 5.8, the ninth air outlet 5.9, the tenth air outlet 5.10, the eleventh air outlet 5.11, the first horizontal shutter 6.1, the second horizontal shutter 6.2, the first blade control knob 9.1, the second blade control knob 9.2, the first filter 10.1, the second filter 10.2, the first cover 11.1 and the second cover 11.2.

A distance between a top of the front-mounted air duct 4 and a top of the refrigerated compartment 1 is 300 mm; the horizontal installations of the first air outlet 5.1, the second air outlet 5.2, the third air outlet 5.3, the fourth air outlet 5.4, the fifth air outlet 5.5, the six air outlet 5.6, the seventh air outlet 5.7, the eighth air outlet 5.8, the ninth air outlet 5.9, the tenth air outlet 5.10, and the eleventh air outlet 5.11 are described as above, and the vertical lengths of the air outlets are all 130 mm; the air outlets are oblique and face downward, and the air outlets incline to a direction in which external cold air enters the front-mounted air duct 4; the first air the air outlets incline to a direction in which external cold air enters the front-mounted air duct 5.1, the second air outlet 5.2, the third air outlet 5.3, the fourth air outlet 5.4, the fifth air outlet 5.5, the sixth air outlet 5.6, the seventh air outlet 5.7, the eighth air outlet 5.8, the ninth air outlet 5.9 and the tenth air outlet 5.10 are all reversing three-way air outlets, and the eleventh air outlet 5.11 is a non-return three-way air outlet; the wind deflectors 12 are mounted directly above the air outlets, and the wind deflectors 12 include the first wind deflector 12.1, the second wind deflector 12.2, the third wind deflector 12.3, the fourth wind deflector 12.4, the fifth wind deflector 12.5, the sixth wind deflector 12.6, the seventh wind deflector 12.7, the eighth wind deflector 12.8, the ninth wind deflector 12.9 and the tenth wind deflector 12.10; each of the air deflectors has a length of 285 mm, and an angle between each of the air deflectors and a top surface of the front-mounted air duct 4 is 20°; a vertical height of the wind deflectors is 38% of a height of the front-mounted air duct 4; the first horizontal louver 6.1 and the second horizontal louver 6.2 both have a size of 1000×500 mm, and a distance between a bottom surface of the refrigerated compartment 1 and the horizontal louvers is 500 mm; the first blade control knob 9.1 and the second blade control knob 9.2 are respectively mounted below the first horizontal louver 6.1 and the second horizontal louver 6.2; the installation conditions of the first filter 10.1, the second filter 10.2, the first cover 11.1 and the second cover 11.2 are described as above.

The non-return three-way air outlets are used to introduce the one-way cold air into the refrigerated compartment 1.

The reversing three-way air outlet is used to collect the cold air that has failed to be introduced into the refrigerated compartment 1, and then introduces the collected cold air into the refrigerated compartment 1.

The air deflectors are used to change a flow direction of the outdoor cold air entering the front-mounted air duct 4, to introduce a part of the cold air to the air outlets, where a part of the cold air with a higher wind speed directly passes through the air deflector and is introduced by a next air deflector.

The first blade control knob 9.1 and the second blade control knob 9.2 are mounted inside the refrigerated compartment 1, and are respectively mounted below the first horizontal louver 6.1 and the second horizontal louver 6.2; the first blade control knob 9.1 and the second blade control knob 9.2 are rotated to control the opening conditions of the first horizontal louver 6.1 and the second horizontal louver 6.2.

Figure 3A:
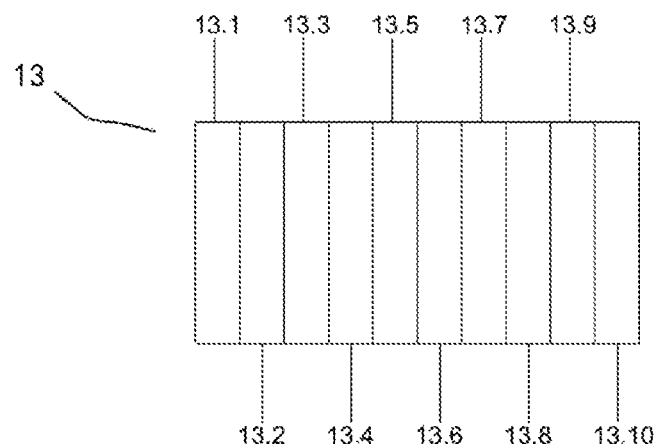
FIG. 3A is a schematic diagram of a first air window structure of the front-mounted external cold air intake system for the large refrigerated truck.
Figure 3B:
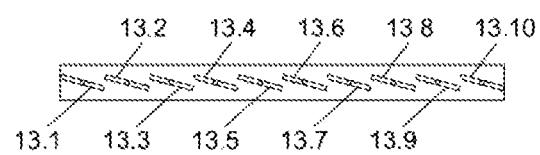
FIG. 3B is a top view of the first air window structure of the front-mounted external cold air intake system for the large refrigerated truck, in which the first air window structure is open.
Figure 3C:
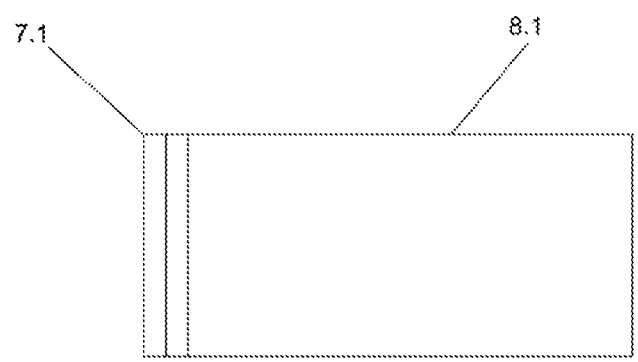
FIG. 3C is a schematic diagram of a first external structure of the front-mounted external cold air intake system for the large refrigerated truck.

FIG. 3A is a schematic diagram of a first air window structure of the front-mounted external cold air intake system for the large refrigerated truck; and FIG. 3B is a top view of the first air window structure of the front-mounted external cold air intake system for the large refrigerated truck, in which the air window structure is open. Referring to FIGS. 3A-C, the first air window structure includes the first folding elbow 7.1, the first windshield 8.1, the first blade 13.1, the second blade 13.2, the third blade 13.3, the fourth blade 13.4, the fifth blade 13.5, and the sixth blade 13.6, the seventh blade 13.7, the eighth blade 13.8, the ninth blade 13.9, and the tenth blade 13.10.

The first blade 13.1, the second blade 13.2, the third blade 13.3, the fourth blade 13.4, the fifth blade 13.5, the sixth blade 13.6, the seventh blade 13.7, the eighth blade 13.8, the ninth blade 13.9, and the tenth blade 13.10 form a first blade group.

The first blade group forms the first horizontal louver 6.1; each of the blades has a size of 100×500 mm, where a center of rotation of each of the blades is a central axis of the corresponding blade, and the maximum rotation angle is set to 20°, and it can only be opened to 15° at most when in use; the scale of the opening degree is marked on the first blade control knob 9.1, where the remaining 5° is used as a buffer margin to prevent the damage caused by excessive force.

The first folding elbow 7.1 has a height of 500 mm and a radius of 100 mm, and is made of soft plastics.

The first windshield 8.1 has a height of 500 mm and a radius of 1000 mm, and is made of aluminum alloy.

When the first air window structure is not in use, the first blade 13.1, the second blade 13.2, the third blade 13.3, the fourth blade 13.4, the fifth blade 13.5, the sixth blade 13.6, the seventh blade 13.7, the eighth blade 13.8, the ninth blade 13.9, and the tenth blade 13.10 are adjusted to be closed, and then the first windshield 8.1 is turned to close the first horizontal shutter 6.1.

Figure 4A:
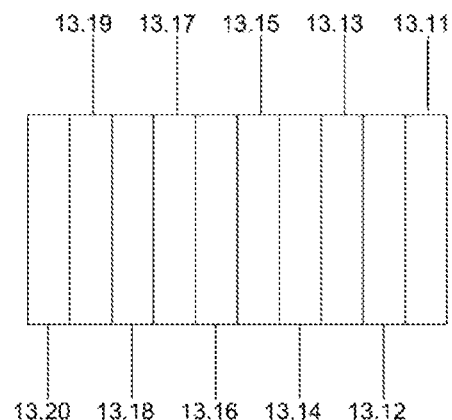
FIG. 4A is a front view of a second air window structure of the front-mounted external cold air intake system for the large refrigerated truck.
Figure 4B:
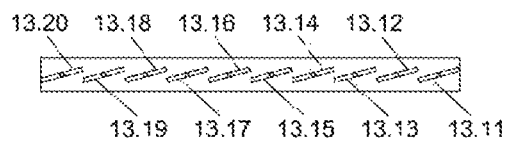
FIG. 4B is a top view of the second air window structure of the front-mounted external cold air intake system for the large refrigerated truck when the air window structure is open.
Figure 4C:
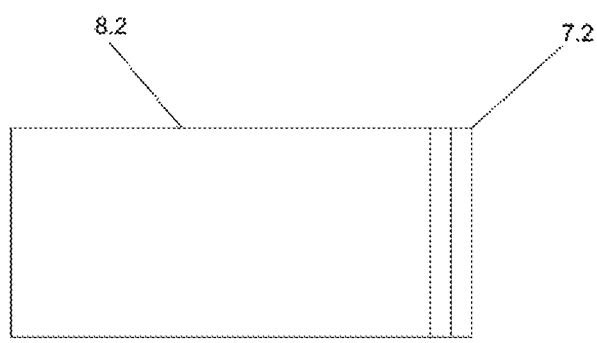
FIG. 4C is a schematic diagram of a second external structure of the front-mounted external cold air intake system for the large refrigerated truck.

FIG. 4A is a schematic diagram of a second air window structure of the front-mounted external cold air intake system for the large refrigerated truck; and FIG. 4B is a top view of the second air window structure of the front-mounted external cold air intake system for the large refrigerated truck, in which the air window structure is open. Referring to FIGS. 4A-C, the second air window structure comprises the second folding elbow 7.2, the second windshield 8.2, the eleventh blade 13.11, the twelfth blade 13.12, the thirteenth blade 13.13, the fourteenth blade 13.14, the fifteenth blade 13.15, the sixteenth blade 13.16, the seventeenth blade 13.17, the eighteenth blade 13.18, the nineteenth blade 13.19 and the twentieth blade 13.20.

The eleventh blade 13.11, the twelfth blade 13.12, the thirteenth blade 13.13, the fourteenth blade 13.14, the fifteenth blade 13.15, the sixteenth blade 13.16, the seventeenth blade 13.17, the eighteenth blade 13.18, the nineteenth blade 13.19 and the twentieth blade 13.20 form a second blade group.

The second blade group forms the second horizontal louver 6.2; each of the blades has a size of 100×500 mm, where a center of rotation of each of the blades is a central axis of the corresponding blade, and the maximum rotation angle is set to 20°, and it can only be opened to 15° at most when in use; the scale of the opening degree is marked on the second blade control knob 9.2, where the remaining 5° is used as a buffer margin to prevent the damage caused by excessive force.

The second folding elbow 7.2 has a height of 500 mm and a radius of 100 mm, and is made of soft plastics.

The second windshield 8.2 has a height of 500 mm and a radius of 1000 mm, and is made of aluminum alloy.

When the second air window structure is not in use, the eleventh blade 13.11, the twelfth blade 13.12, the thirteenth blade 13.13, the fourteenth blade 13.14, the fifteenth blade 13.15, the sixteenth blade 13.16, the seventeenth blade 13.17, the eighteenth blade 13.18, the nineteenth blade 13.19 and the twentieth blade 13.20 are adjusted to be closed, and then the second windshield 8.2 is turned to close the second horizontal shutter 6.2.

The blades are made of polycarbonate.

After the outdoor cold air is introduced into the refrigerated compartment 1, the first air window structure and the second air window structure are used to discharge excess air in the refrigerated compartment 1; at the same time, due to the presence of the windshield, it is negligible that the outdoor cold air enters the refrigerated compartment 1 from the first air window structure and the second air window structure. Therefore, the first air window structure and the second air window structure are mainly used for exhausting to keep an air pressure in the refrigerated compartment 1 stable.

The above-mentioned embodiment is only intended to illustrate the principle and uses of the present invention, but not to limit the scope of the present invention. Any modification or change of the embodiment can be made by those skilled in the art without departing from the spirit and scope of the present invention. Therefore, all equivalent modifications or changes made by those ordinary skill without departing from the spirit and technical ideas of the present invention shall fall within the scope of the appended claims of the present invention.

What is claimed is:

1. A front-mounted external cold air intake system for a refrigerated truck, comprising: a refrigerated compartment, an indoor chiller unit, an outdoor chiller unit, a front-mounted air duct, a plurality of air outlets, a plurality of horizontal louvers, a plurality of folding elbows, a plurality of windshields, a plurality of blade control knobs, a plurality of filters, a plurality of covers, a plurality of wind deflectors, and a plurality of blades;

wherein the plurality of air outlets comprise a first air outlet, a second air outlet, a third air outlet, a fourth air outlet, a fifth air outlet, a sixth air outlet, a seventh air outlet, an eighth air outlet, a ninth air outlet, a tenth air outlet and an eleventh air outlet;

the plurality of horizontal louvers comprise a first horizontal louver and a second horizontal louver;

the plurality of folding elbows comprise a first folding elbow and a second folding elbow;

the plurality of windshields comprise a first windshield and a second windshield;

the plurality of blade control knobs comprise a first blade control knob and a second blade control knob;

the plurality of filters comprise a first filter and a second filter;

the plurality of covers comprise a first cover and a second cover;

the plurality of wind deflectors comprise a first wind deflector, a second wind deflector, a third wind deflector, and a fourth wind deflector; a fifth wind deflector, a sixth wind deflector, a seventh wind deflector, an eighth wind deflector, a ninth wind deflector, and a tenth wind deflector;

the plurality of blades comprise a first blade, a second blade, a third blade, a fourth blade, a fifth blade, a sixth blade, a seventh blade, an eighth blade, a ninth blade, a tenth blade, an eleventh blade, a twelfth blade, a thirteenth blade, a fourteenth blade, a fifteenth blade, a sixteenth blade, a seventeenth blade, an eighteenth blade, a nineteenth blade and a twentieth blade;

the first air outlet, the second air outlet, the third air outlet, the fourth air outlet, and the fifth air outlet form a first air outlet group; and the sixth air outlet, the seventh air outlet, the eighth air outlet, the ninth air outlet and the tenth air outlet form a second air outlet group;

the first horizontal louver, the first folding elbow and the first windshield form a first air window structure; and the second horizontal louver, the second folding elbow and the second windshield form a second air window structure;

the first blade, the second blade, the third blade, the fourth blade, the fifth blade, the sixth blade, the seventh blade, and the eighth blade, the ninth blade and the tenth blade form a first blade group; and the eleventh blade, the twelfth blade, the thirteenth blade, the fifteenth blade, the sixteenth blade, the seventeenth blade, the eighteenth blade, the nineteenth blade and the twentieth blade form a second blade group;

the indoor chiller unit and the outdoor chiller unit are mounted directly across from each other at a front location of the refrigerated compartment;

the front-mounted air duct is U-shaped and has a rectangular cross section, and is mounted in the refrigerated compartment; two air inlets are respectively mounted at two sides of the outdoor chiller unit;

the air outlets are mounted on the front-mounted air duct and comprise non-return three-way air outlets and a reversing three-way air outlet, wherein the non-return three-way air outlets spaced apart are provided on a straight section of the front-mounted air duct that is parallel to an axis of the refrigerated compartment, and the reversing three-way air outlet is mounted on an arc section of the front-mounted air duct at a junction of the front-mounted air duct and the axis of the refrigerated compartment;

the horizontal louvers are mounted on a lower part of both sides of the refrigerated compartment; each of the horizontal louvers consists of 10 blades, and directions in which the blades rotate are controlled by the blade control knobs, wherein a safety angle of rotation of each of the blades is 15° with a buffer margin of 3-5°;

the windshields are mounted outside the horizontal louvers and are connected with the refrigerated compartment via the folding elbows; an opening angle of windshields is controlled by the folding elbows; wherein a safety opening angle of each of the windshields is 0-15° with a buffer margin of 3-5°;

the horizontal louvers, the folding elbows and the windshields form the first and second air window structures;

the filters are mounted at the air inlets of the front-mounted air duct and cover the air inlets; and the covers are mounted in a front outer side of the refrigerated compartment for closing the front-mounted air duct when the front-mounted external cold air intake system is not in use.

2. The front-mounted external cold air intake system of claim 1, wherein, the front-mounted air duct and the air outlets are made of aluminum alloy; and the air inlets of the front-mounted air duct are covered with the filters.

3. The front-mounted external cold air intake system of claim 1, wherein, the air outlets incline to correspond to a direction in which external cold air enters the front-mounted air duct.

4. The front-mounted external cold air intake system of claim 3, wherein, a distance between two adjacent air outlets is 800-1200 mm.

5. The front-mounted external cold air intake system of claim 1, wherein, when mounting the filters, an elastic margin of 0.5-2 cm is remained for each of the filters to withstand an impact of an airflow.

6. The front-mounted external cold air intake system of claim 1, wherein, a maximum opening angle of each of the windshields is 18°~20°.

7. The front-mounted external cold air intake system of claim 1, wherein, the folding elbows are made of soft plastics.

8. The front-mounted external cold air intake system of claim 1, wherein, the blades of the horizontal louvers are made of resin or lightweight materials.

9. The front-mounted external cold air intake system of claim 8, wherein, the horizontal louvers are configured to discharge air for air circulation, and are mounted on lower parts of two sides close to a rear of the refrigerated compartment.

10. The front-mounted external cold air intake system of claim 1, wherein, a vertical height of each of the wind deflectors is 30-40% of a height of the front-mounted air duct.

* * * * *